T. G. GATHRIGHT.
GOVERNOR AND PRESSURE REGULATOR FOR STEAM ENGINES.
APPLICATION FILED DEC. 23, 1911.
1,049,696.
Patented Jan. 7, 1913.
2 SHEETS—SHEET 1.
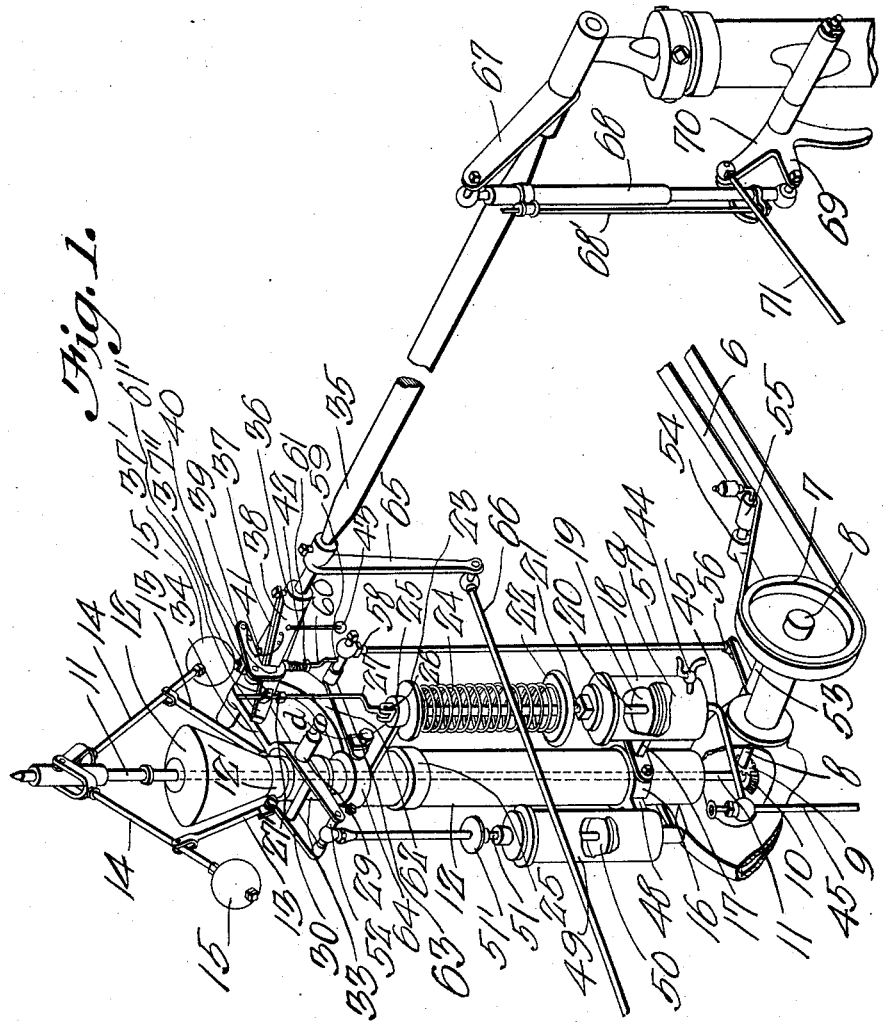
Thomas G. Gathright
Inventor
by C. A. Snow & Co.
Attorneys

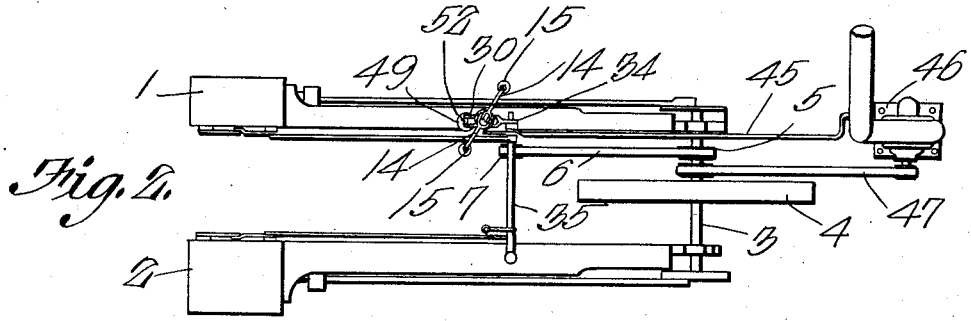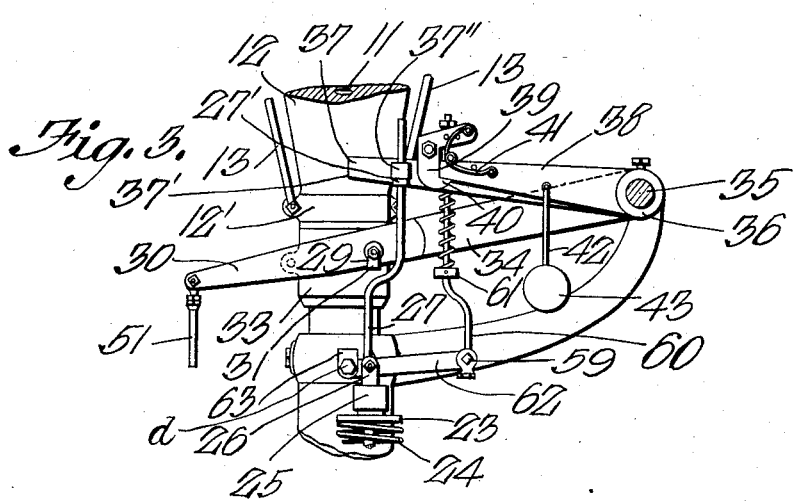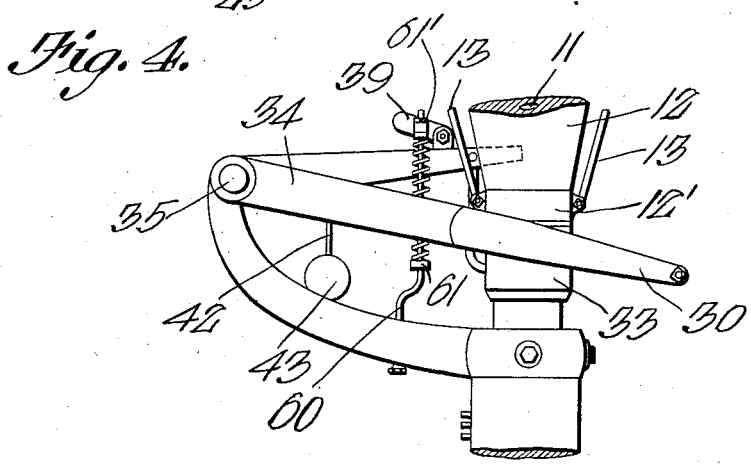

UNITED STATES PATENT OFFICE.

THOMAS G. GATHRIGHT, OF MERIDIAN, MISSISSIPPI.

GOVERNOR AND PRESSURE-REGULATOR FOR STEAM-ENGINES.

1,049,696. Specification of Letters Patent. Patented Jan. 7, 1913.

Application filed December 23, 1911. Serial No. 667,463.

*To all whom it may concern:*

Be it known that I, THOMAS G. GATHRIGHT, a citizen of the United States, residing at Meridian, in the county of Lauderdale and State of Mississippi, have invented a new and useful Governor and Pressure-Regulator for Steam-Engines, of which the following is a specification.

This invention relates to improvements in governor and pressure regulators for steam engines, and the primary object of the invention is the provision of a mechanism operably disposed with relation to the speed governor thereof, whereby the release of the pressure of the water controlled by the engine will automatically stop the engine and also whereby the breaking of the governor belt will automatically stop the engine.

A further object of this invention is the provision of a pressure regulating mechanism operably disposed with relation to the speed governor mechanism to be operated by a novel throw-off, or by a pressure regulating device when the pressure of the water controlled by the engine falls below normal, another mechanism being operably connected through means of an idler to the governor belt or operating mechanism so that the breaking of said belt or the throwing off thereof will automatically operate the governor to bring the engine to a halt.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings—Figure 1 is a perspective view of a governor mechanism constructed according to and embodying the present invention, the same being operably connected to a rod reaching from the high pressure to the low pressure side of a Corliss cross compound engine, the engine not being shown. Fig. 2 is a diagrammatic top plan view of the high pressure and low pressure cylinder of a Corliss cross compound engine with the device in operable relation thereon, the same being reduced in scale from that shown in Fig. 1. Fig. 3 is a side elevation of the inner side of the governor mechanism showing the mechanism carried by the governor post. Fig. 4 is a view taken from the side opposite to Fig. 3.

Referring to the drawings, the numeral 1 designates the high pressure cylinder, and 2 the low pressure cylinder of a Corliss cross compound engine, the pistons of which are operably connected to the shaft 3 provided with the usual fly or balance wheel 4 and with the governor pulley 5, which is connected through the medium of the belt 6 to the pulley 7 mounted upon the shaft 8, whose inner gear 9 is in mesh with the gear 10 upon the lower end of the governor shaft 11, said governor shaft being rotatably mounted in the vertical post 12 disposed in operable relation to the engine. Mounted upon the upper end for sliding movement thereon and to be rotatable therewith, is the speed governor weight 12, provided with the grooved collar portion 12' while pivotally connected to the collar portion 12', are the oppositely extending arms 13 which in turn are pivotally connected to the arms 14 carrying the governor balls 15, this construction being of the usual ball governor construction now employed.

Carried upon the post 12 near the lower end thereof is a collar 16, having connected to one side thereof a bracket 17, carrying the cylinder 18 provided in its lower end with the water compartment *a* and having mounted therein for reciprocation, the piston head 19 having its rod 20, which projects upwardly therefrom, mounted and guided in the collar 25 carried upon the arm at the upper end of the post 12. The piston rod 20 above the upper head of the cylinder 18 is threaded and has mounted thereon the adjusting milled disk 22 which by reason of the stationary disk 23 carried in the upper end by the arm 25 retains the spring 24 around the stem or rod 20 and adjusts the same to exert the desired tension upon the piston head within the cylinder 18 and toward the water compartment *a* thereof.

Carried at the upper end of the rod 20 is a coupling 26 to whose lower end is pivoted the vertically movable rod 27, which is provided with the adjustable stop 27'. To the fork 30 is connected a sleeve or rod 29, carrying the cam 31 at its outer end and in the path of the outer end of the lever 38. The arms 30 form a yoke which surrounds the collar 33 slidably mounted upon the post 12 and having its terminal arm 34 pivotally or loosely connected upon the end of the transverse shaft 35, which is disposed in bearing, transversely of the engine, as clearly shown in Fig. 2.

Connected for oscillating the shaft 35 is a collar 36 carrying a trigger or lever 38, another lever 37, longer than the lever 38 being pivoted upon said shaft beyond the collar and adjacent thereto and having its outer free end 37' provided with an eyed lug 37'' in which the upper end of the shaft or rod 27 is guided, the adjustable lug 27' thereon being adapted to co-act with the eyed lug 37'' as will presently appear. Carried by the lever 37 is a pivoted hook or catch 39 which is normally held so that its hooked end 40 by means of the spring 41 will engage the outer end of the trigger or lever 38 and hold the said lever relatively to the lever 37, as clearly shown in Fig. 1. Mounted upon the said lever 38 is a link 42 which carries a weight 43, the purpose of which will appear later.

As noted the water compartment $a$ of the cylinder 18 is provided with a draw-off cock or faucet 44 and leading from the lower end of said compartment is a valved conduit or pipe 45 which is operably connected with a main pressure supply as for instance a pump 46, the same being operably connected through the belt 47 to the drive shaft of the engine.

Under normal conditions, the pressure within the cylinder 18 will hold the piston 19 and consequently the rods 20 and 27 elevated with the stop 27' below and in engagement with the lugs 37'', Fig. 3, thus holding the lever 37 in upward position. Should the pressure reduce sufficiently to permit the plunger 19, assisted by the spring 24, to drop, the free end of the lever 37 will also lower and consequently permit the weight 43 to pull the levers 38 and 37 downwardly and rock the shaft 35 to stop the engine.

Formed integral with the collar 16 and at right angles to the bracket 17 is a bracket 48, which carries the oil chamber or cylinder 49, in which is mounted the perforated dash piston 50 having connected thereto a rod 51, and the adjusting disk 51', the upper end of said rod 51 being pivotally connected through means of the cross head 52 to the outer end of the arms 30 and 32 of the yoke.

The spool or shaft 53 is mounted for an oscillating movement upon the shaft 8 and carries the arm 54, upon which is mounted the idler 55 which rests normally in engagement with the upper lead of the belt 6, another arm 56 being carried by said shaft 53 and operable therewith and having connected at its outer end a reach or rod 57 which is connected at 58 to the pin 59 secured in the free end of the lever 62, the rod 60 having a spring actuated adjusting nut 61 extending upwardly from the pin 59 and operably connected to the spring actuated catch 39 carried by the lever or arm and toward the water compartment $a$ thereof. 37, the rod 57 being normally held upwardly and by its pin connected to the lever 62 to hold it and the rod 60 so that normally the hook 39 is held in engagement with the end of the short lever 38. The arm 59 as stated is connected in the outer end of the lever 62, which is pivoted by means of the stud $d$ to the collar 64 and carries the adjustable stop 63 thereon. Thus upon the breakage or slackening of the belt 6, the rod 57 is pulled downwardly and in turn pulls the rod 60 to release the hook 39 from the lever 38.

Keyed upon the rock shaft 35 and extending downwardly therefrom so as to receive a rocking movement therefrom is an arm 65, which is connected to the reach rod 66 whose other end is operably connected for controlling the valves of the high pressure cylinder 1 of the engine, while connected for simultaneous movement to the shaft 35 at the opposite side thereof is an arm or lever 67, which through the means of the adjustable rod 68 and its parallel adjusting rod 68', is connected to the short arm 69 of the lever 70, whose upper end in turn is connected to the reach rod 71 which is operably connected to the valve controlling mechanism of the low pressure cylinder 2. By this means it will be seen that any movement of the shaft 35 will simultaneously operate the levers 65 and 67 and consequently the reach rods 66 and 71, thus simultaneously stopping or retarding the movement of the pistons in the respective high and low pressure cylinders of the engine.

In order to satisfactorily operate the present invention, the fly ball governor used, is of a type which will move between its extreme positions in response to a comparatively slight change in speed of the engine.

Under ordinary running conditions, the belt 6 retains the arm 54 in a substantially stationary position, thus holding the rod 57 and the arm 62 stationary or nearly so, the arms 37 and 38 are therefore held together by the spring catch 39 and the rod 60 is unaffected, while the pressure within the cylinder 18 will hold the piston 19 upwardly so that the rod 27 with its abutment 27' will retain the lever or arm 37 elevated, the arm 39 being in engagement with the arm 38 will also hold this arm 38 upwardly and thus prevent the shaft 35 from being rocked or released to operate the stopping devices of the engine. Now assuming that the engine exceeds its speed limit, the governor device raises the arm 30, carrying the cam 31, which strikes and raises the lever 37. This lever 37 carries with it the catch 39, which by reason of its operating end being held by the rods 57 and 60, has its hooked end released from the lever 38, which being released falls and thus permits the actuation or oscillation of the shaft 35 to operate the rods 66 and 71 to bring the engine to a halt. Again assuming that the belt 6 breaks, the arm 54 will fall and rock the shaft 53 to lower the rods 57 and 60. This action pulls the catch 39 to release its hooked end from the lever 38 similar to the release thereof by the governor arms 30, this action permitting the shaft 35 to oscillate to bring the engine to a halt. The third stoppage condition arises when the pressure below the piston 19 falls and permits the spring 24 to force the piston 18 and rod 27 downwardly, the stop 27' thus being lowered and permitting the levers 37 and 38 to fall and thus oscillate the shaft 35 to operate the engine halting devices controlled by the rods 66 and 71.

What is claimed is:

1. The combination with an engine having a high and a low pressure cylinder, and a rock shaft connected transversely of the engine, of a governor mechanism operably connected with the engine and rock shaft, mechanism operably connected with the rock shaft and governor operating mechanism for operating the rock shaft by the severing of the operating connection between the governor and engine, and a pressure operated mechanism also operably connected to the rock shaft for operating the same to stop the engine upon the reduction of the pressure.

2. The combination with an engine having a high and a low pressure cylinder, and a rock shaft connected transversely of the engine, of a governor mechanism, means operably connecting the governor mechanism with the engine, mechanism operably connected to said means and to the rock shaft for operating the rock shaft by the severing of the governor mechanism from the engine, and a pressure operated and spring returned mechanism operably connected to the rock shaft for operating the same to stop the engine upon the reduction of the pressure.

3. In a governor and pressure regulating mechanism, the combination with a rock shaft operably connected to the controlling mechanism of an engine, of a belt operably connected to the engine, a governor shaft operably connected thereto, means for operably connecting the governor to the rock shaft, an auxiliary mechanism operably connected to the belt and to the rock shaft for operating the rock shaft to stop the engine due to the disconnection of the belt, and a pressure operated mechanism operably connected to the rock shaft for operating the same by the reduction of the pressure therein.

4. In a governor and pressure regulating mechanism, the combination with a rock shaft operably connected to the controlling mechanism of an engine, of a belt operably connected to the engine, a governor shaft operably connected thereto, means for operably connecting the governor to the rock shaft, an auxiliary mechanism operably connected to the belt and to the rock shaft for operating the rock shaft to stop the engine due to the disconnection of the belt, and a pressure operated and spring returned mechanism operably connected to the rock shaft for operating the rock shaft due to the reduction of the pressure.

5. In a governor and pressure regulating mechanism for steam engines, the combination with a rock shaft operably connected to the controlling mechanism of the engine, a belt operably connected to said engine, a governor mechanism operably connected to said belt, means for operably connecting said governor mechanism to the rock shaft, a trigger hingedly connected to said rock shaft, an arm mounted upon said rock shaft for independent movement thereon and disposed in parallel with said trigger, a spring actuated catch carried thereby and normally in engagement with said trigger to permit the lever and trigger to move in unison, and means operably connected with the belt and with said lever to actuate the catch due to the severing of the belt.

6. In a governor and pressure regulating mechanism for steam engines, the combination with a rock shaft operably connected to the controlling mechanism of the engine, of a belt operably connected to said engine, a governor mechanism operably connected to said belt, means for operably connecting said governor mechanism to the rock shaft, a trigger hingedly connected to said rock shaft, an arm mounted upon said rock shaft for independent movement thereon and disposed in parallel with said trigger, a spring actuated catch carried thereby and normally in engagement with said trigger to permit the lever and trigger to move in unison, means operably connected with the belt and with said lever to actuate the catch due to the severing of the belt, and a pressure operated mechanism operably connected to said lever and adapted to operate the same due to the reduction of pressure therein.

7. In a governor and pressure regulating mechanism for steam engines, the combination with a rock shaft operably connected to the controlling mechanism of the engine, a belt operably connected to said engine, a governor mechanism operably connected to said belt, means for operably connecting said governor mechanism to the rock shaft, a trigger hingedly connected to said rock shaft, an arm mounted upon said rock shaft for independent movement thereon and disposed in parallel with said trigger, a spring actuated catch carried thereby and normally in engagement with said trigger to permit the lever and trigger to move in unison, means operably connected with the belt and with said lever to actuate the catch due to the severing of the belt, and a pressure operated and spring returned mechanism operably connected to said lever adapted to operate said lever upon the reduction of the pressure.

8. The combination with a transversely disposed rock shaft operably connected to the controlling mechanism of a steam engine, of a belt operably connected to the steam engine, a ball governor operably connected to said belt, a trigger connected to said rock shaft, a lever loosely mounted upon said rock shaft adjacent to said trigger, a catch carried by said lever and normally in engagement with said trigger, means operably connected with said ball governor and said lever for releasing the trigger and operating the rock shaft, means operably connected with the belt and to said lever for operating the lever due to the severing of the belt, and a pressure operated mechanism operably connected to said lever for operating the lever and rock shaft due to the reduction of pressure therein.

In testimony that I claim the foregoing as my own, I have hereto affixed my signature in the presence of two witnesses.

THOMAS G. GATHRIGHT.

Witnesses:
   THOS. G. FEWELL,
   C. B. CAMERON.

Copies of this patent may be obtained for five cents each, by addressing the "Commissioner of Patents, Washington, D. C."